R. E. HELLMUND.
SYSTEM OF CONTROL.
APPLICATION FILED MAY 7, 1917.
1,344,762.
Patented June 29, 1920.
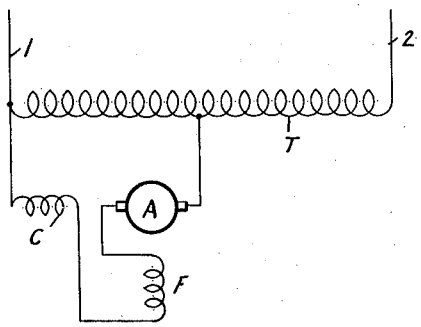
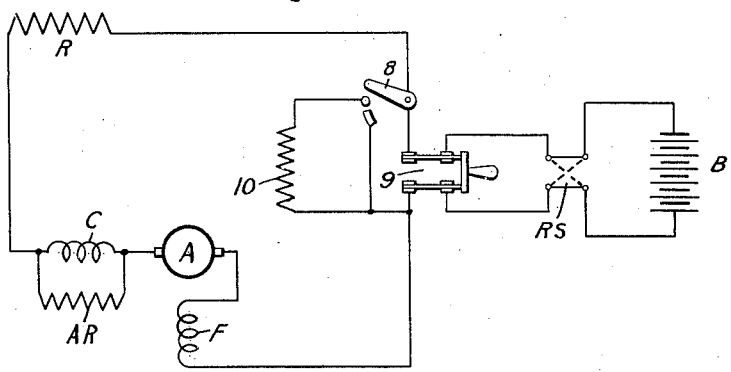
WITNESSES:
Fred H Miller
W. R. Coley
INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,344,762.  Specification of Letters Patent.  Patented June 29, 1920.

Original application filed September 10, 1914, Serial No. 860,995. Divided and this application filed May 7, 1917. Serial No. 166,863.

*To all whom it may concern:*

Be it known that I, RUDOLF E. HELLMUND, a subject of the German Empire, and a resident of Swissvale, in the county of Allegheny and State of Pennsylvania, have invented a new and useful Improvement in Systems of Control, of which the following is a specification, the present application being a division of my copending application, Serial No. 860,995, filed September 10, 1914.

My invention relates to systems of control, and it has special reference to regenerative systems that are adapted to be employed in connection with electric railway vehicles and the like.

The object of my invention is to provide a system of the above-indicated character which shall be simple and inexpensive in construction, and efficient and reliable in operation, and which shall obviate certain operating difficulties which have heretofore been experienced in such systems.

More specifically stated, the object of my invention is to provide simple and reliable means for dynamically braking, with direct-current, one or more motors that are embodied in an electric railway vehicle and that are adapted to be accelerated from an alternating-current supply circuit.

In the prior art, various systems have been proposed for electrically braking vehicles that embody alternating-current motors by arranging the circuits to adapt the motors to return alternating current to the supply circuit, or by exciting the motors from the supply circuit and connecting the armatures through suitable translating devices. However, many operating difficulties and undesirable conditions have arisen, partially by reason of the heavy wattless current and relatively low power-factors that obtained. Moreover, in case the supply-circuit voltage failed, no means for electrically braking the vehicle was available, with the result that the air or other mechanical brakes have been inadequate to meet certain emergencies, such as safely bringing the vehicle to the bottom of a long grade.

In the accompanying drawing, Figure 1 is a diagrammatic view of an alternating-current system for accelerating a suitable motor; and Fig. 2 is a diagrammatic view of the circuit connections employed during direct-current dynamic braking of the motor shown in Fig. 1.

Referring to Fig. 1 of the drawing, the system shown comprises a suitable supply circuit 1—2 across which a transformer winding T of any suitable type is connected, and a propelling motor, preferably of the commutator type, which is provided with an armature A, a main or exciting field winding F and an auxiliary or compensating field winding C. Inasmuch as the particular system for accelerating the motor is not material to my present invention, none will be described here, and it will be understood that any suitable and well known system may be employed.

Reference may now be had to Fig. 2, wherein is illustrated the main motor, such as is employed in the system of Fig. 1, a braking resistor R, a battery B, a multi-position single pole battery switch 8, a double-pole battery switch 9, a reversing switch RS, of any familiar type, for reversing the battery connections, a bridging resistor 10, and a suitable shunting resistor AR which is disposed in parallel-circuit relation to the compensating field winding C. The function of the shunting resistor AR is to reduce the compensating effect of the field winding C when direct current is traversing the motor, inasmuch as, while the field winding C affords proper compensation during alternating-current operation, the motor will, in many cases, be over-compensated during direct-current operation unless the compensating field winding current is reduced, as shown in the figure, or in some other suitable manner.

The purpose of the system here shown is to obviate the use of a motor-generator set or other source of energy for permanently exciting the field winding F of the main motor during the braking period. When it is desired to dynamically brake the vehicle, the circuits are initially arranged as shown in the drawing, with the switch 9 occupying its closed position, thereby connecting the battery B in circuit with the main motor to produce or insure the correct magnetization of the field winding F initially. As soon as the motor voltage has been sufficiently built-up, the switch 8 may be moved to its first operative position, wherein the resistor 10 is disposed to temporarily bridge the battery B, and the switch 9 is opened, whereby the battery B is excluded from circuit, whereupon the switch 8 may be moved to its final and direct-connected position. The momentum-driven motor will thereafter excite itself in a satisfactory manner, as will be understood. If it is desired to charge the battery B during direct-current dynamic braking of the vehicle, this may be readily accomplished in any suitable manner, such as, by reversing the connections of the battery B relative to the braking circuit, by means of the reversing switch RS, and preferably shunting a suitable resistor, such as the resistor 10, across its terminals.

I do not wish to be restricted to the specific circuit connections and location of parts herein set forth, as various modifications thereof may be made within the spirit and scope of my invention. I desire, therefore, that only such limitations shall be imposed as are indicated in the appended claims.

I claim as my invention:

1. In a system of control, the combination with a dynamo-electric machine having an armature and a field winding, of electric energy means connected in series relation with the armature and the field winding for initiating electrical braking action of said machine, and means for subsequently excluding said energy means from circuit to permit electrical braking action of the machine acting as a self-excited generator.

2. In a system of control, the combination with a dynamo-electric machine having an armature and a field winding, of a source of voltage inserted in series relation with said machine and having an electromotive force in the same direction as the machine generated voltage to initiate the building-up of such generated voltage.

In testimony whereof I have hereunto subscribed my name this 5th day of May, 1917.

RUDOLF E. HELLMUND.